US009063388B1

(12) United States Patent
Weber

(10) Patent No.: US 9,063,388 B1
(45) Date of Patent: Jun. 23, 2015

(54) INTERCHANGEABLE CAMERA LENS

(71) Applicant: Carl Zeiss AG, Oberkochen (DE)

(72) Inventor: Uwe Weber, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 14/578,289

(22) Filed: Dec. 19, 2014

(30) Foreign Application Priority Data

Dec. 20, 2013 (DE) .......................... 10 2013 022 013

(51) Int. Cl.
*G03B 9/02* (2006.01)
*G03B 9/07* (2006.01)
*G03B 17/56* (2006.01)

(52) U.S. Cl.
CPC ................ *G03B 9/07* (2013.01); *G03B 17/565* (2013.01)

(58) Field of Classification Search
USPC .......................................................... 396/505
See application file for complete search history.

(56) References Cited

U.S. PATENT DOCUMENTS

| 3,062,120 A | 11/1962 | Mahn |
| 4,505,564 A * | 3/1985 | Nishio et al. ................. 396/505 |
| 2013/0163979 A1 | 6/2013 | Kuroiwa et al. |

FOREIGN PATENT DOCUMENTS

| CH | 350541 A | 11/1960 |
| DE | 7022384 U | 11/1971 |
| DE | 2725404 A1 | 12/1978 |
| DE | 8414563 U1 | 5/1985 |

OTHER PUBLICATIONS

English translation of the Office action of the German Patent Office dated Jul. 15, 2014 in German patent application 10 2013 022 013.0 on which the claim of priority is based.

* cited by examiner

*Primary Examiner* — Clayton E Laballe
*Assistant Examiner* — Dennis Hancock
(74) *Attorney, Agent, or Firm* — Walter Ottesen P.A.

(57) ABSTRACT

An interchangeable camera lens includes a main barrel for holding a diaphragm and optical elements, wherein the optical elements define an optical axis (A), a diaphragm rotating ring, rotatable by way of a rotational movement about the optical axis (A), for setting the diaphragm to different f-number values, and a click-stop device. The click-stop device interacts with the diaphragm rotating ring in such a way that the click-stop device is effective in an active work position and the diaphragm rotating ring is therefore rotatable in a stepped manner. The click-stop device is ineffective in an inactive work position and the diaphragm rotating ring is therefore continuously rotatable, wherein the click-stop device comprises a click-stop element seated on a pressure element. The click-stop element is pressable into click-stop grooves by the pressure of the pressure element to enable a step-wise rotation of the diaphragm rotating ring in the active work position. Means are provided for selectively activating and deactivating the click-stop device, wherein the means comprise a movement element which is arranged between the pressure element and the click-stop element and a switching element is assigned to the movement element to fix the movement element in such a detachable manner that the click-stop element is pressable into a click-stop groove by the pressure element in the active work position and not pressable into the click-stop groove by the pressure element in the passive work position.

25 Claims, 10 Drawing Sheets

INTERCHANGEABLE CAMERA LENS

CROSS REFERENCE TO RELATED APPLICATION

This application claims priority of German patent application no. 10 2013 022 013.0, filed Dec. 20, 2013, the entire content of which is incorporated herein by reference.

FIELD OF THE INVENTION

The invention relates to an interchangeable camera lens.

BACKGROUND OF THE INVENTION

Interchangeable camera lenses with click-stop devices for the diaphragm rotating rings thereof are known.

The object of these click-stop devices is to provide the user with haptic and/or acoustic feedback relating to the adjustment of the diaphragm rotating rings. By way of example, click-stop grooves may be provided at the typical f-number settings 22-11-8-5.6-4-2.8-2. Then, the user can quickly find the correct f-number setting for his photographs.

However, such click-stop devices are disadvantageous for those users who wish to use interchangeable camera lenses for producing a film. These days, most digital system cameras, for example digital single-lens reflex cameras and mirrorless system cameras, provide the option of making photographs and producing videos.

Here, a system camera is understood to mean a camera which includes interchangeable components within a fully compatible camera system. In general, a system camera includes a camera and interchangeable lens.

While amateurs often work using standard autofocus lenses, more ambitious amateurs and professional cameramen often use manual lenses in order to shoot relatively high-quality films using this alternative which, compared to professional camera equipment, is compact and cost effective. Here, direct control over focus and diaphragm should be enabled.

Commercially available manual lenses are designed for photographic applications and therefore have the aforementioned click-stop mechanism on the diaphragm rotating ring, the click-stop mechanism enabling an adjustment in steps, usually in half f-number steps. The spacing of the steps in this case usually corresponds to what the camera can usefully process for forming exposure time/diaphragm combinations.

This click-stop mechanism is bothersome when recording moving images since a continuous, that is, step-less, diaphragm adjustment, which avoids brightness jumps in the image, is advantageous during filming.

Users who nevertheless want a continuous adjustment therefore often convert the lenses by virtue of removing the click-stop sphere and spring. To this end, several parts on the lens have to be disassembled, which may lead to misalignment or damage in the case of an unskilled execution. Ultimately, the user also invalidates the warranty by these interventions.

The prior art has disclosed lenses with click-stop devices in which the click-stop device continues to be effective in an active work position. In a passive work position, the click-stop device is then ineffective, that is, the diaphragm rotating ring can then be set continuously.

Lenses with such click-stop devices are known from, for example, DE2725404A1, CH350541 and United States patent application publication 2013/0163979A1.

In the case of known click-stop devices, a click-stop sphere sits on a click-stop spring in a bore in the main barrel. A disadvantage of the known click-stop devices is that a component is pushed between the click-stop sphere and the click-stop groove there in order to remove the click-stop effect. However, the pressure on the click-stop sphere by the compression spring remains such that the click-stop sphere now in turn tries to press the component into the click-stop groove. Therefore, a certain amount of pressure is maintained, even in the deactivated state, and the diaphragm rotating ring only moves on the main barrel with increased friction. A further disadvantage lies in the fact that external switching levers are provided in the known prior art, and these could be actuated inadvertently while recording the film.

SUMMARY OF THE INVENTION

It is an object of the present invention to provide an interchangeable camera lens having an alternative click-stop device and a method for activating and deactivating a click-stop device of the diaphragm of an interchangeable camera lens, which remove the aforementioned disadvantages.

The object is achieved by an interchangeable camera lens having the features of an interchangeable camera lens including: a plurality of optical elements defining an optical axis (A); a diaphragm defining a range of f-number values; a main barrel configured to hold the optical elements and the diaphragm; a diaphragm rotating ring configured to be rotatable about the optical axis (A) for setting the diaphragm to different ones of the f-number values via a rotational movement; a click-stop device having an active work position and an inactive work position and being configured to interact with the diaphragm rotating ring such that: i) the click-stop device is effective in the active work position and the diaphragm rotating ring is therefore rotatable in a stepped manner; ii) the click-stop device is ineffective in the inactive work position and the diaphragm rotating ring is therefore continuously rotatable; iii) wherein the click-stop device has a pressure element configured to apply pressure and a click-stop element disposed on the pressure element and the click-stop element being configured to be pressed into click-stop grooves via the pressure of the pressure element so as to enable rotation of the diaphragm rotating ring in a stepped manner in the active work position; a selection device configured to selectively activate and deactivate the click-stop device; the selection device having a movement element arranged between the pressure element and the click-stop element; and, a switch element associated with the movement element and configured to releasably fix the movement element so as to enable the click-stop element to be pressed into one of the click-stop grooves in the active work position and to prevent the click-stop element from being pressed into one of the click-stop grooves in the inactive work position.

The object is further achieved by a method for activating and deactivating a click-stop device. The method includes the steps of: enabling a stepped rotation of the diaphragm rotating ring in the active work position in that the click-stop element is pressed into click-stop grooves via the pressure element; and, preventing a pressure transfer from the pressure element to the click-stop element in the inactive work position in that the movement element acts in an impeding manner between the pressure element and the click-stop element.

The invention allows the click-stop mechanism to be disconnected by the user. This allows the user to use the camera lens both for photography (click-stop on) and for filming (click-stop off). Switching occurs quickly and without disassembling the mount of the interchangeable camera lens. The space required in the interchangeable camera lens is small and the costs for making the click-stop mechanism are low.

By way of example, the click-stop device can be arranged in a bore of the main barrel. The click-stop element, for example, a click-stop sphere, is arranged on a compression spring exerting pressure in such a way that the click-stop sphere is pressed against the diaphragm rotating ring and slightly pressed into the click-stop groove at the respective click-stop groove of the diaphragm rotating ring, as a result of which the user obtains haptic and acoustic feedback.

Alternatively, the compression spring can also be arranged in the diaphragm rotating ring and the click-stop sphere can be brought into engagement with a click-stop groove in the main barrel.

The click-stop sphere can be arranged in a radial bore of the diaphragm rotating ring and then be pressed against the outer surface of the main barrel. Or the click-stop sphere can be arranged in a radial bore of the main barrel and then be pressed against the inner surface of the diaphragm rotating ring.

Alternatively, the click-stop sphere can also be attached in a bore of the diaphragm rotating ring parallel to the optical axis and then be pressed against the adjoining end face of the main barrel. Or the click-stop sphere can be attached in a bore of the main barrel parallel to the optical axis and then be pressed against the adjoining end face of the diaphragm rotating ring.

A roller or cam or any other suitable element can also be provided as a click-stop element instead of a click-stop sphere. The click-stop sphere may have a diameter of 0.5 to 2.5 mm, preferably a diameter of 0.8 to 1.7 mm, for example 1.5 mm.

Alternatively, the compression spring and click-stop element can also be arranged in an (axial) bore of the diaphragm rotating ring. The main barrel then includes the corresponding click-stop grooves.

The movement element can be embodied as rocker or wedge.

The wedge or slider then acts as a translational element and separates the compression spring and click-stop element by being slid therebetween.

The rocker can be arranged so as to be pivotable about a bearing stud in the main barrel, in particular in such a way that it is radially pivotable about an axis parallel to the optical axis. Alternatively, the rocker and bearing stud may also be arranged in the diaphragm rotating ring.

Preferably, the bearing stud is arranged in one end region of the rocker and the click-stop element is arranged at the other end region of the rocker such that the rocker exerts a pressure extending substantially radially in relation to the optical axis on the click-stop element, wherein the compression spring acts on the rocker in turn.

In the active work position, the movement element can be released by the switching element in such a way that the pressure spring presses the click-stop element into a click-stop groove by way of the movement element.

In the inactive work position, the movement element can be fixed by the switching element in such a way that the pressure spring cannot exert any pressure on the click-stop element; this means that the movement element is fixed in such a way that the click-stop element cannot be pressed into a click-stop groove.

The switching element can be adjusted between the active work position and the inactive work position from outside of the interchangeable camera lens. By way of example, to this end, a bore can be provided in the interchangeable camera lens. By way of example, the bore is formed in the lens mount and is oriented substantially parallel to the optical axis. Then, an actuation element, for example, a screwdriver, can switch the switching element from one work position into the other work position through the bore. By way of example, to this end, the actuation element can have a slit or slot, into which the screwdriver engages and rotates the actuation element, for example by 180°.

A switching spring can exert force on to the switching element in such a way that the switching element remains in the respectively set work position until the work position is changed by the actuation element, for example by the rotation described in the previous paragraph. Here, the switching element is embodied in such a way that it can be reliably switched between two switching states and remains in each switching state without independent switching being possible.

The switching element can be embodied as a pin. By way of example, the pin may include the aforementioned slit at one of its ends. Moreover, the pin may include an eccentric element which, for example, is arranged at the other end of the pin or at the other end region of the pin. This means that, as seen in the axial extent of the pin, the eccentric element is arranged offset to this axis in order thereby to act on the movement element.

Flattenings, which are also referred to as flats, in particular two opposing flattenings, can be formed in a section along an axial extent of the pin, which flattenings, in particular, interact with the aforementioned switching spring.

The switching spring can be embodied as a leaf spring. By way of example, the switching spring is mounted in a recess in the main barrel. In the active work position, the switching spring can be pressed against the first flattening and, in the inactive work position, the switching spring can be pressed against the second, for example, opposite, flattening. Here, the eccentric element can be arranged in such an eccentric manner on the pin that the eccentric element fixes the movement element in the active work position and releases the movement element in the inactive work position.

The position of the click-stop grooves can be selected in such a way that exact setting to the f-number values applied to the diaphragm rotating ring is made possible in the active work position.

The pressure element can be embodied as a compression spring, in particular a cylindrical compression spring. The compression spring can be replaced by a different type of spring, for example, by a leaf spring, leg spring, torsion rod, in particular of a metallic type. Use can also be made of an elastic spring type, for example, rubber.

The interchangeable camera lens can include a lens mount for connection to the camera mount of a camera.

It is understood that the features mentioned above and the features yet to be explained below are usable not only in the respectively specified combination, but also in other combinations or on their own, without departing from the scope of the present invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
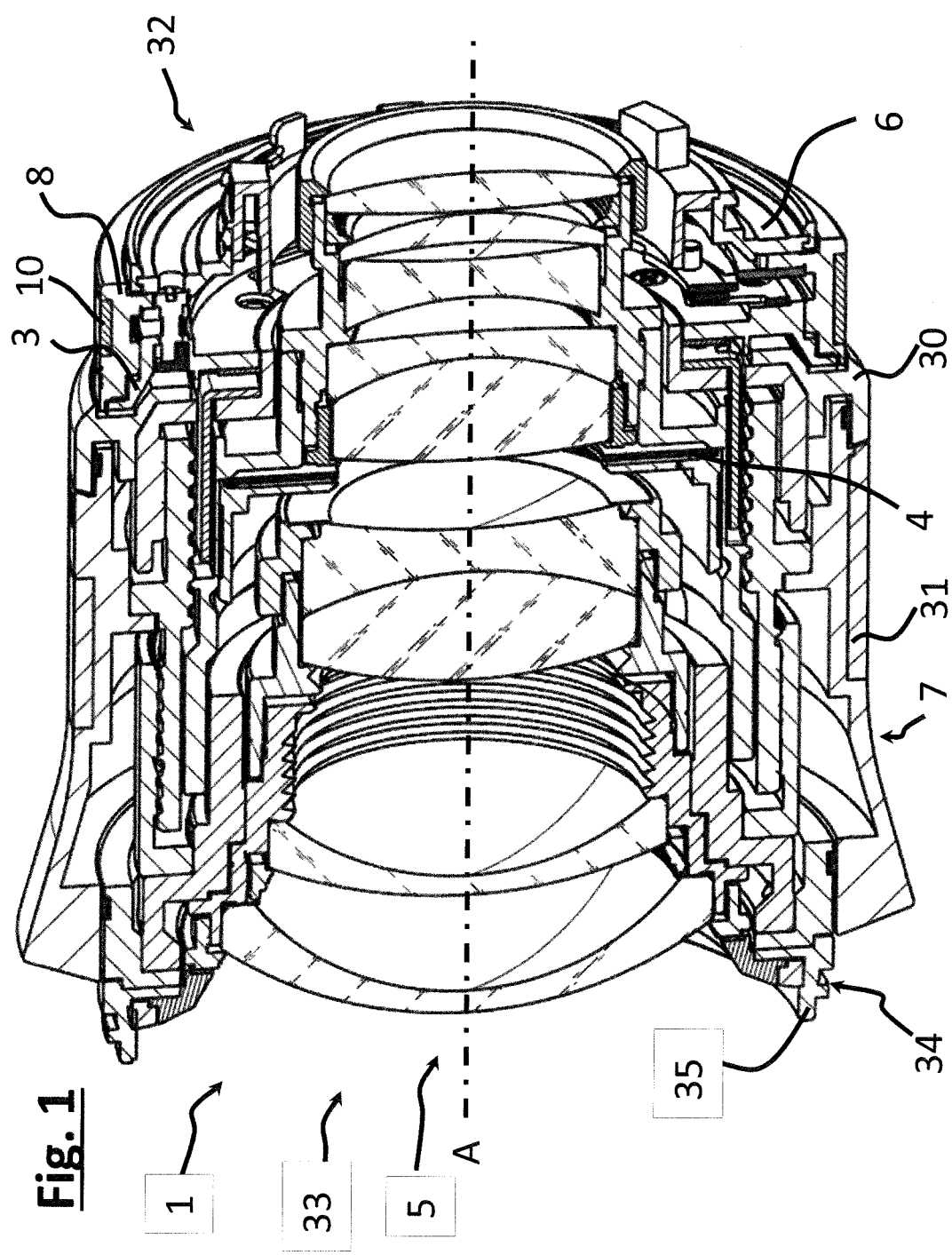
FIG. 1 shows a longitudinal section through an interchangeable camera lens of the invention in the active work position.

FIG. 1 shows a longitudinal section through an interchangeable camera lens 1 according to the invention. It is possible to identify the main barrel 3, in which the diaphragm 4, in this case the iris diaphragm, and the optical elements 5, that is, lenses of the interchangeable camera lens 1, are arranged. The main barrel 3 is surrounded by a housing 7 with a diaphragm rotating ring 8, a depth-of-field ring 30 and a focusing ring 31. A lens mount 6 is situated on the camera-side end face 32 of the lens; a bayonet lens hood 34 and a filter thread 35 are arranged on the lens-side end face 33.

The optical elements 5 define the optical axis A of the interchangeable camera lens 1. In the assembled state of the interchangeable camera lens 1, the mechanical axis of the main barrel 3, lens mount 6 coincide with the optical axis A of the optical elements 5 of the interchangeable camera lens 1.

Figure 2:
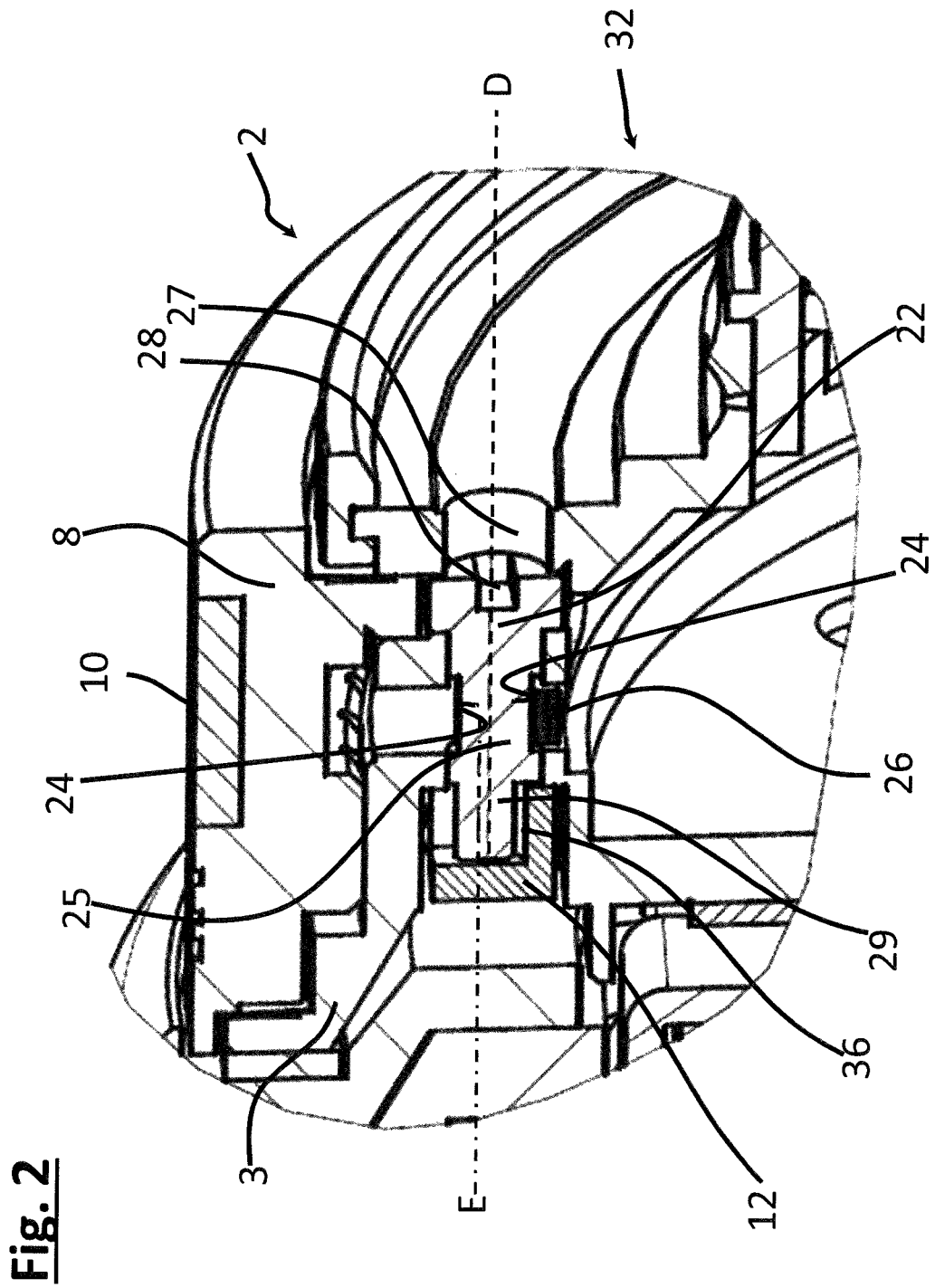
FIG. 2 shows a detailed section from FIG. 1 with a click-stop device in the active work position.

FIG. 2 shows a detailed section from FIG. 1 in the region of the click-stop device 2. Here, the click-stop device 2 is in the active work position. This can be identified by the gap 36 between the eccentric lug 29 and rocker 12. The functionality of the invention will be explained in more detail in the description of the following figures.

Figure 3:
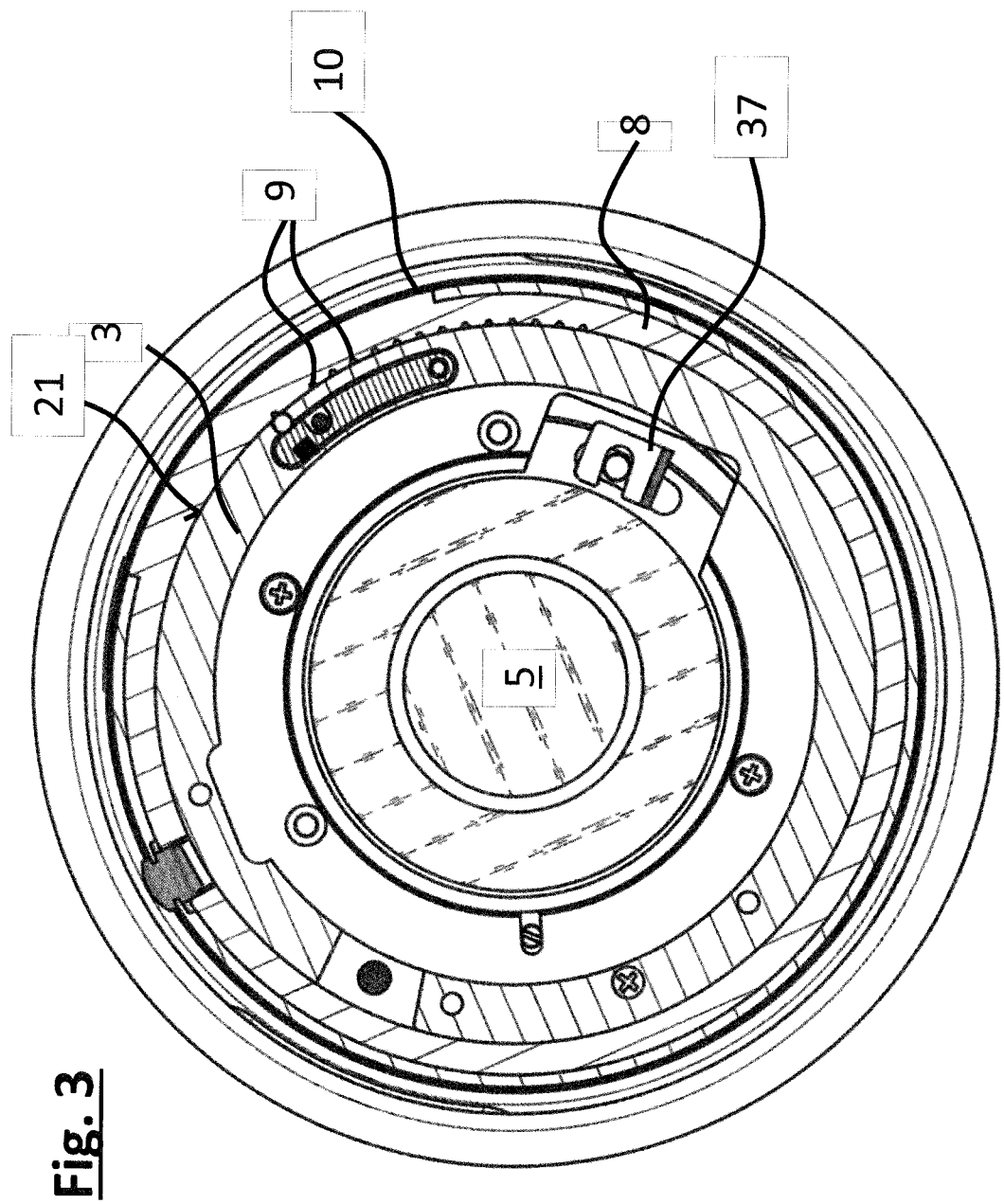
FIG. 3 shows a cross-section through the interchangeable camera lens from FIG. 1 with a click-stop device in the active work position.

FIG. 3 shows a cross-section through the lens of FIG. 1 according to the invention in the region of the click-stop device 2. Reference sign 37 denotes part of the diaphragm mechanism. The diaphragm rotating ring 8 has click-stop grooves 9 facing the main barrel at its interface 21; for improved clarity, these are only partly provided with reference signs. By way of example, click-stop grooves 9 can be provided at the typical diaphragm settings 22-11-8-5.6-4-2.8-2. These f-numbers k are usually depicted visibly to the user on the outer side 10 of the diaphragm rotating ring 8. The user can then quickly find the correct diaphragm setting for his photographs. The f-number k of the interchangeable camera lens 1 is the ratio between the focal length f and diameter D of the effective entrance pupil k=f/D.

Figure 4:
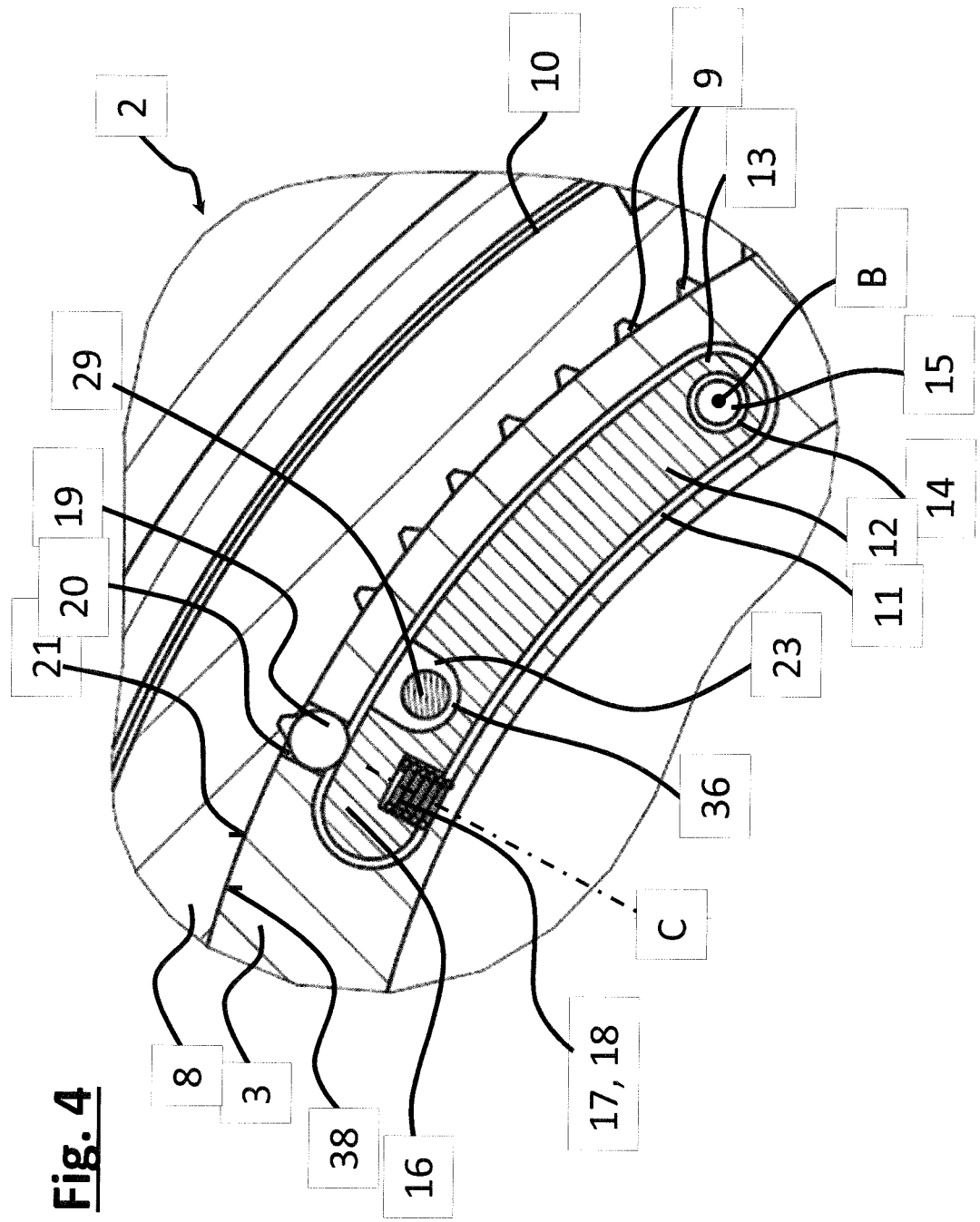
FIG. 4 shows a detailed section from FIG. 3.
Figure 5:
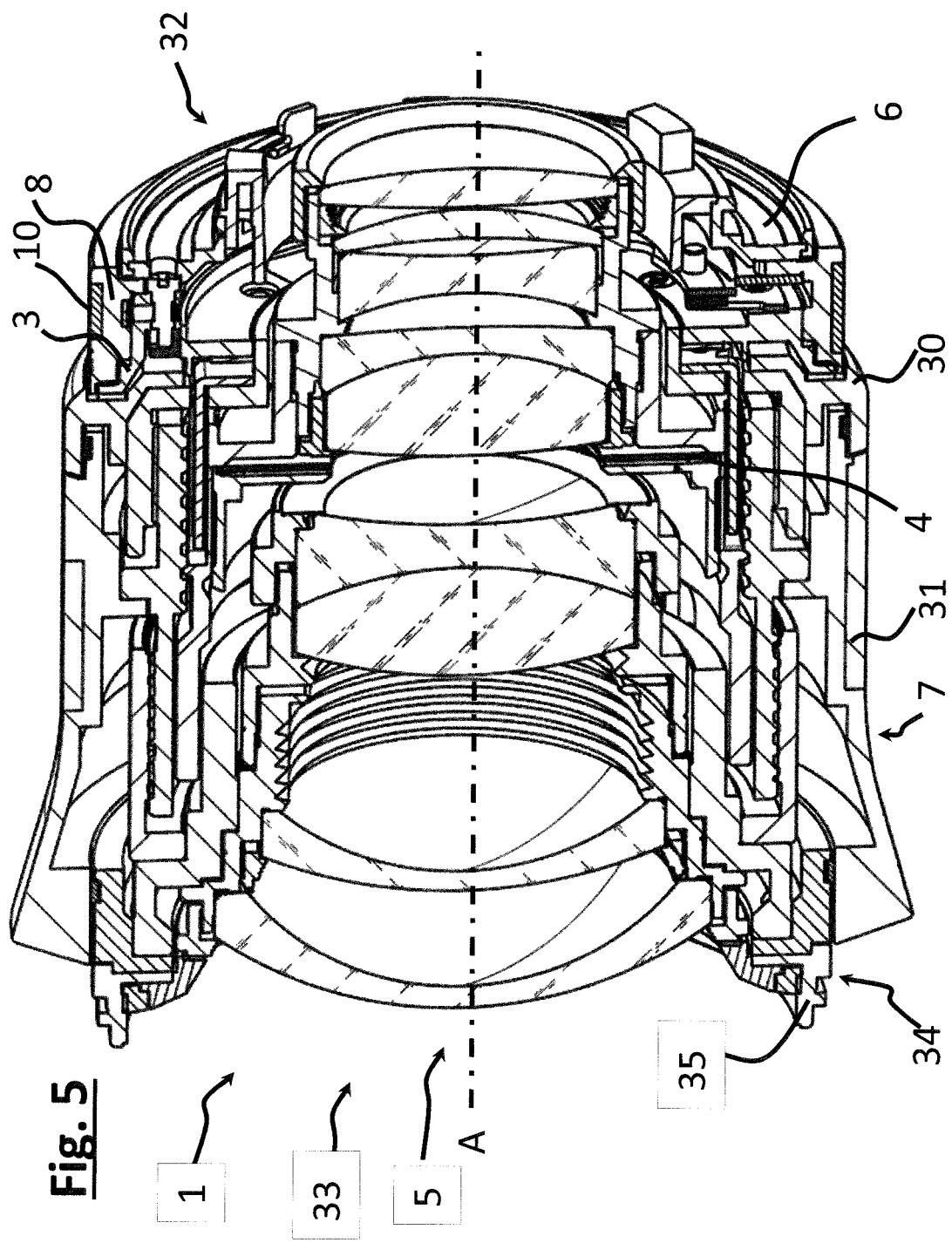
FIG. 5 shows a longitudinal section through an interchangeable camera lens according to the invention in the inactive work position.
Figure 6:
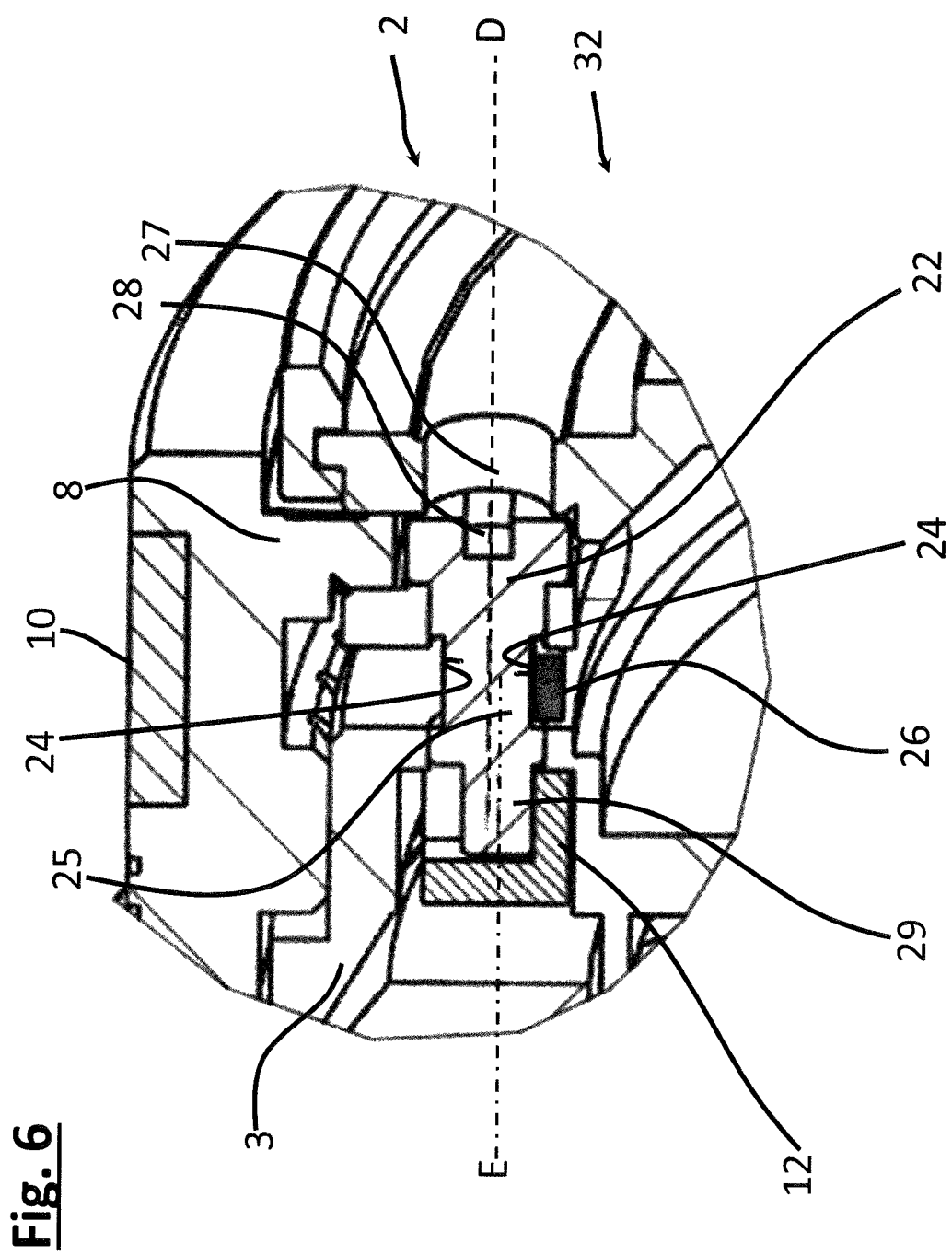
FIG. 6 shows a detailed section from FIG. 5 with a click-stop device in the inactive work position.
Figure 7:
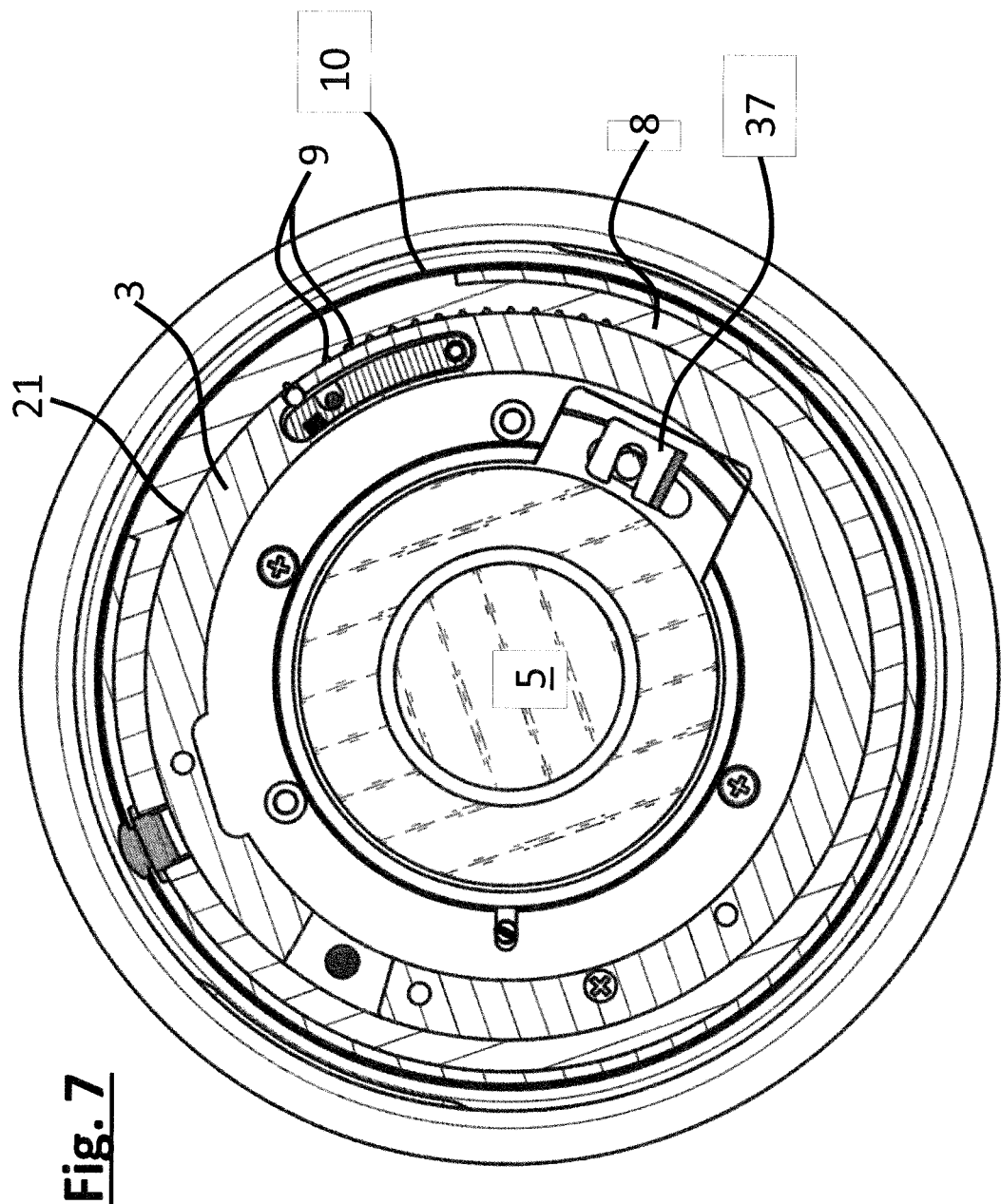
FIG. 7 shows a cross-section through the interchangeable camera lens from FIG. 5 with a click-stop device in the inactive work position.
Figure 8:
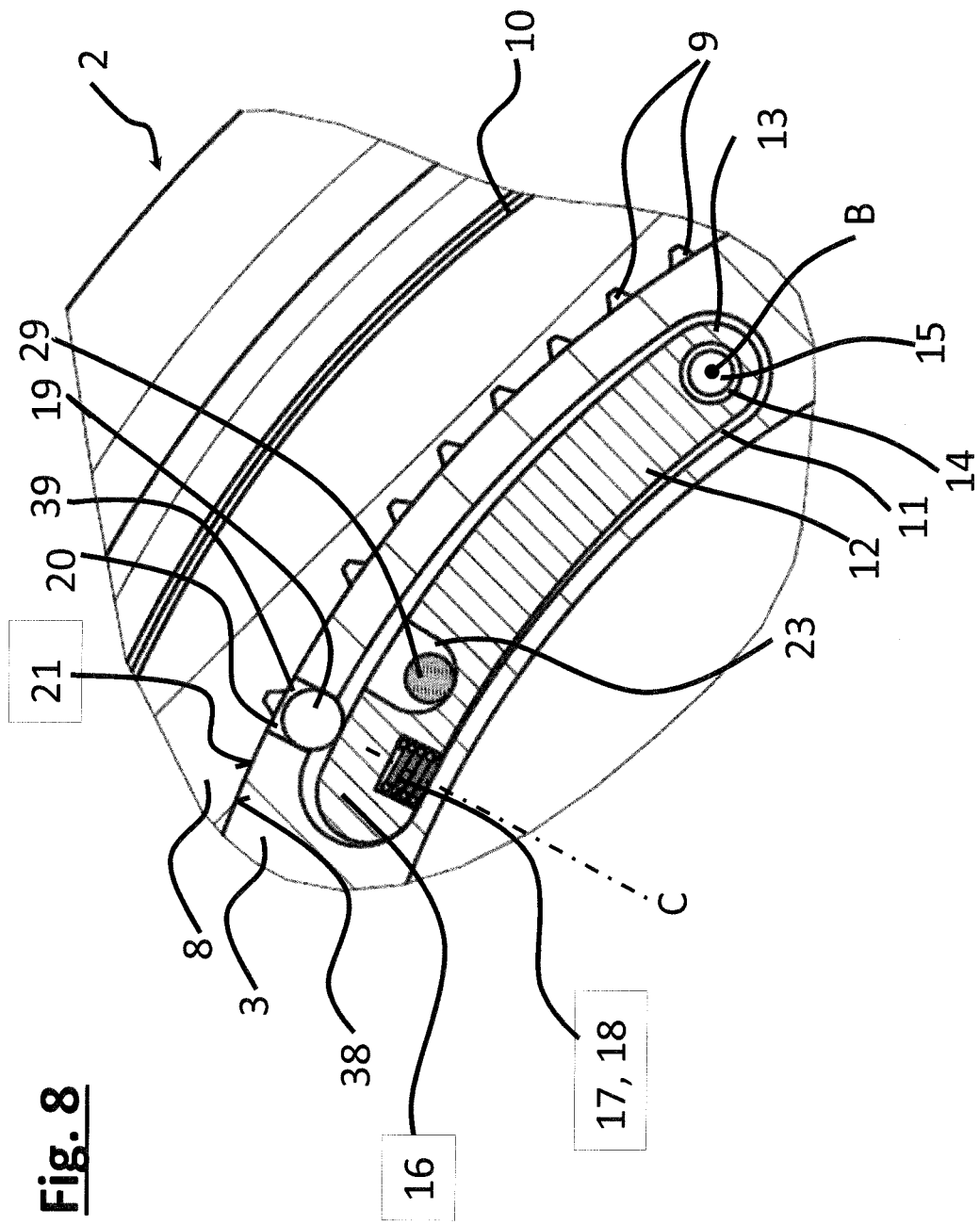
FIG. 8 shows a detailed section from FIG. 7.

FIG. 4 shows a detailed section of FIG. 3 in the region of the click-stop device 2. A movement element, in this case a rocker 12, is formed in a cutout 11 of the main barrel 3. The rocker 12 has a bore 14 in one end region 13, into which bore a bearing stud 15 engages and about which the rocker 12 is rotatably mounted.

A recess 17, in which a compression spring 18 engages, is situated as far away as possible from the bearing stud 15 in the other end region 16 of the rocker 12. Along the axial extension of the compression spring axis C, this compression spring 18 exerts a pressure on a click-stop sphere 19, which is housed in a radial bore 20 of the main barrel 3, via the rocker 12.

Therefore, part of the rocker 12 lies between the compression spring 18 and the click-stop sphere 19. Therefore, the click-stop sphere 19 is pressed into one of the click-stop grooves 9 against the inner surface 21 of the diaphragm rotating ring 8.

So that the click-stop device 2 can alternate between an active work position and an inactive work position, provision is made for a switching element 22. The switching element 22 is rotatably mounted in the main barrel 3 and engages with an eccentric lug 29 into a further cutout 23 of the rocker 12.

In FIG. 4, the click-stop sphere 19 is pressed into the outer-most click-stop groove at the f-number k=22. In the present case, this click-stop groove 9 also marks the end position of the diaphragm rotating ring 8. Therefore, the click-stop sphere 19 is partly pressed into the aforementioned outer-most click-stop groove 9 in the active work position. If the diaphragm rotating ring 8 is rotated in the direction of the further click-stop grooves 9, the user first has to overcome a resistance in order to move the click-stop sphere 19 out of the click-stop groove 9.

At the next click-stop groove 9, for example the click-stop groove 9 at the f-number k=11, the click-stop sphere 19 is partly pressed into this click-stop groove 9 and can likewise only be moved out of this click-stop groove 9 again by overcoming a resistance.

The switching element 22 preferably has two defined positions:

In the active work position according to FIGS. 1 to 4, the switching element 22 releases the rocker 12 for a rotational movement about the bearing stud 15, as a result of which the compression spring 18 is able to press the click-stop sphere 19 into a click-stop groove 9 without being hindered by the rocker 12. In the active work position, there is a gap 36 between the eccentric lug 29 and the rocker 12, that is, the eccentric lug 29 does not hinder the movement of the rocker 12. The pivot axis B of the rocker 12, or the bearing stud 15, is attached at the greatest possible distance from the click-stop sphere 19 and the compression spring 18 so that the rocker 12 performs a largely straight-lined movement between the compression spring 18 and the click-stop sphere 19. In the present example, the pivot axis B and the compression spring axis C are rotated by 90° to one another.

In the present embodiment, the distance between the pivot axis B and the compression spring axis C is approximately 15 mm. Distances from 10 mm to 30 mm are also conceivable.

In the present embodiment, the movement of the rocker 12 between the compression spring 18 and the click-stop sphere 19 deviates by 1° from a straight-lined radial movement. However, embodiments with deviations from 0 to 10° are also conceivable.

In the inactive work position, as is shown in FIGS. 5 to 8 and, for example, caused by a rotation of the switching element 22 by 180°, the eccentric lug 29 of the switching element 22 presses the rocker 12 against the compression spring 18. As a result, the compression spring 18 is compressed and the click-stop sphere 19 is no longer pressed against the diaphragm rotating ring 8 with the click-stop grooves 9; that is, the click-stop connection is therefore disconnected. The gap 36 between the eccentric lug 29 and the rocker 12 is now dispensed with. Instead, it is now possible to identify a small gap 39 in the figure between the click-stop sphere 19 and the click-stop groove 9. The rocker 12 is fixed by the switching element 22. This is clarified by the axis E (depicted by dashed line here) of the eccentric part—of the eccentric lug 29—of the pin-shaped switching element 22.

In the inactive work position, the diaphragm rotating ring 8 with the scale—not shown here—assigned thereto is adjustable continuously in order also to be able to set all intermediate values of the diaphragm 4.

A switching element 22 in which a rotation greater than or less than 180° causes the adjustment from the active into the inactive work position is also conceivable.

So that the diaphragm rotating ring 8 can easily rotate on the main barrel 3, a lubricant is provided between the inner surface 21 of the diaphragm rotating ring 8 and the outer surface 38 of the main barrel 3—that is, the so-called click-stop path. This lubricant is also situated in the click-stop grooves 9 and on the click-stop element, in this case the click-stop sphere 19. By way of example, Teflon grease can be used as lubricant.

If the click-stop device 2 is in the inactive work position, the click-stop sphere 19 sinks into the bore 20 during the first rotation of the diaphragm rotating ring 8 and it is held there by the lubricant in the bore 20 due to a slight adhesive effect. Only once the click-stop device 2 is activated is the click-stop sphere 19 again partly pressed out of the bore 20.

Figure 9:
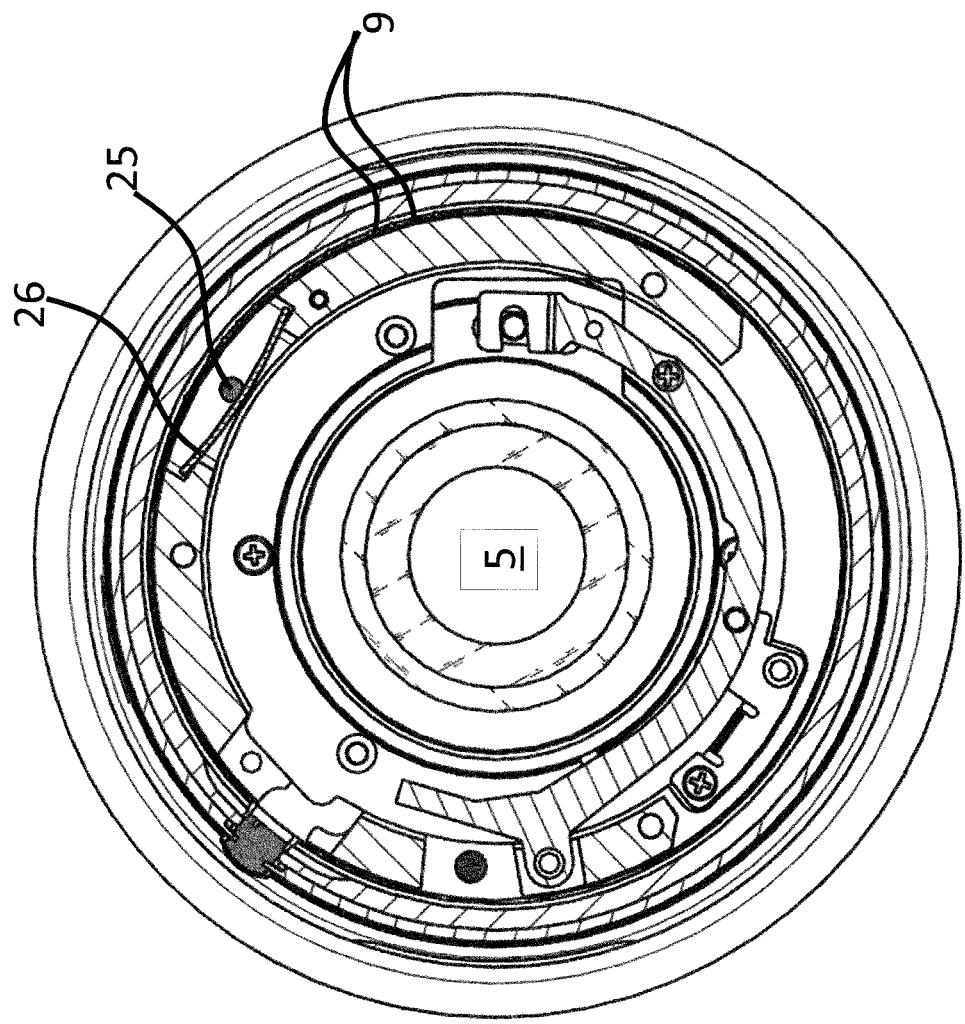
FIG. 9 shows a cross-section of the interchangeable camera lens in the region of the leaf spring; and, FIG. 10 shows a detailed section from FIG. 9.
Figure 10:
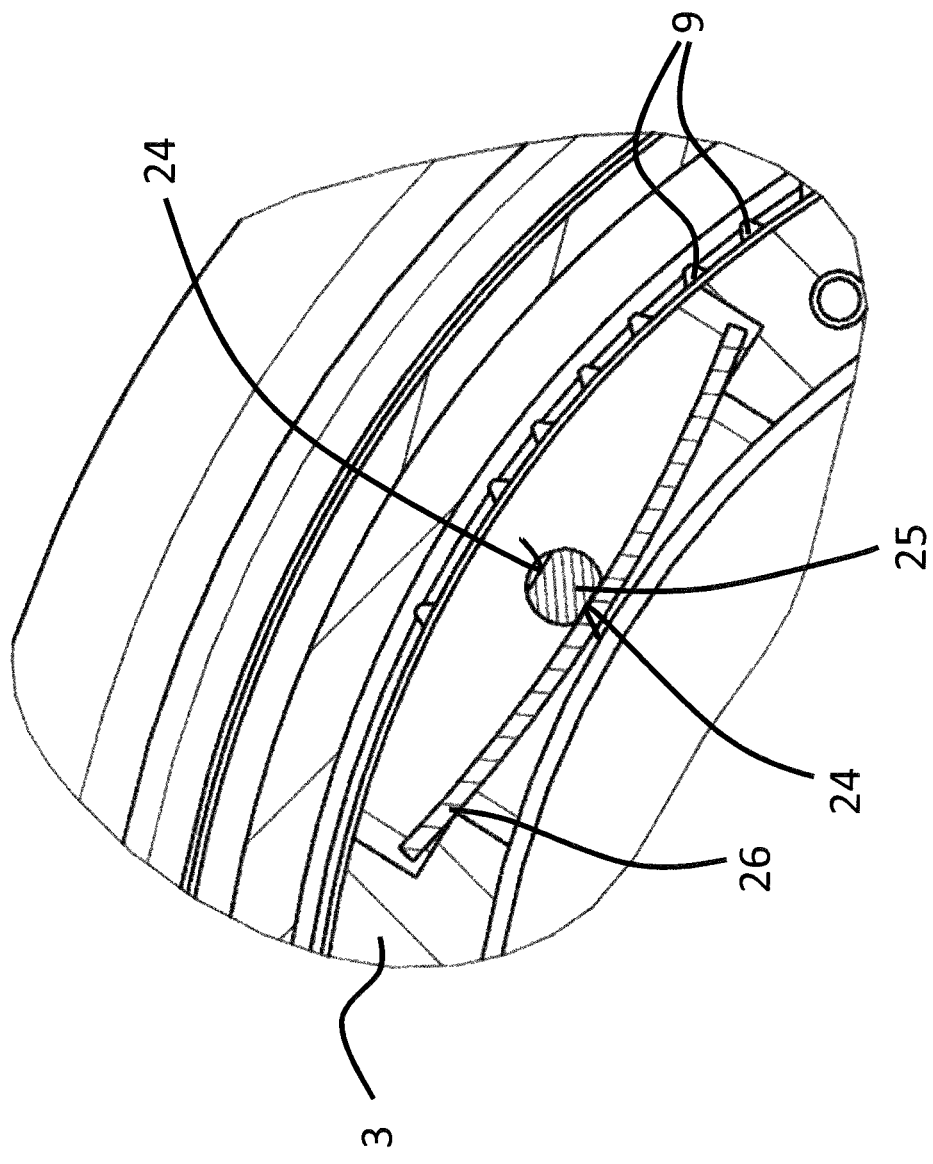

The two positions of the eccentric lug 29 of the switching element 22 are defined on the eccentric shaft 25 by two flattenings 24, also referred to as flats, against which a leaf spring 26 presses in the respective end position. FIG. 9—and FIG. 10 as a detailed view—show the leaf spring 26 engaging on the switching element 22. A cogging torque is produced as a result of the force of this leaf spring 26 and the flats 24. This prevents an unwanted adjustment as a result of shock or vibrations. The magnitude of the cogging torque can be influenced by a stronger or weaker leaf spring 26 and/or by the geometry of the flats 24. This enables secure noticeable and haptically comfortable switching of the click-stop effect. If the leaf spring 26 rests on a flattening 24, an independent rotation of the switching element 22 is effectively curtailed.

The switching is actuated in the sunk interface, for example by a small screwdriver or tool with a similar configuration, which engages through a passage hole 27 in the lens mount 6, in this case a lens bayonet, into a slit 28 at the switching element 22. What this avoids is that the switching is inadvertently actuated by contact when operating the interchangeable camera lens 1, as may happen in the prior art with the externally arranged switches.

During operation, the passage hole 27 is covered by the connected camera—not shown here. Otherwise, the passage hole is protected by the mount cover cap—not depicted here. However, a separate cover, for example, a screwtop, may also be provided.

In principle, it is also possible for the switching element 22 to be operated, for example, via a push button or rotary knob or sliding switch on the diaphragm rotating ring 8. Then, the switch can also be actuated in the assembled state of interchangeable lens 1 and camera.

In the above-described case, the click-stop path extends on the circumference of the diaphragm rotating ring 8 and main barrel 3. However, in principle, it is also possible for the click-stop path to be formed by two ring-shaped planar surfaces, which are rotatable in relation to one another, of the diaphragm rotating ring 8 and main barrel 3. Here, the planar surfaces are, for example, embodied perpendicular to the optical axis A. The click-stop grooves can be formed on the diaphragm rotating ring 8 and the click-stop device can be formed in the main barrel 3, or vice versa.

It is understood that the foregoing description is that of the preferred embodiments of the invention and that various changes and modifications may be made thereto without departing from the spirit and scope of the invention as defined in the appended claims.

LIST OF REFERENCE SIGNS

1 Interchangeable camera lens
2 Click-stop device
3 Main barrel
4 Diaphragm
5 Optical element, lens element
6 Lens mount
7 Housing
8 Diaphragm rotating ring
9 Click-stop groove
10 Outer side of the diaphragm rotating ring
11 Cutout for the rocker
12 Movement element, rocker
13 First end region of the rocker
14 Bore in rocker 12
15 Bearing stud
16 Second end region of the rocker
17 Cutout for the compression spring
18 Pressure element, compression spring
19 Click-stop element, click-stop sphere
20 Radial bore in the main barrel for the click-stop sphere
21 Inner surface of the diaphragm rotating ring
22 Switching element, pin
23 Cutout for the eccentric lug
24 Flattening
25 Eccentric shaft of the switching element
26 Switching spring, leaf spring
27 Bore, through hole
28 Slit
29 Eccentric element, eccentric lug
30 Depth-of-field ring
31 Focusing ring
32 Camera-side end face 32
33 Object-side end face
34 Bayonet lens hood
35 Filter thread
36 Gap between eccentric lug and rocker
37 Part of the diaphragm mechanism
38 Outer surface of the main barrel
39 Gap between click-stop sphere and click-stop groove
A Optical axis, mechanical axis
B Pivot axis of the rocker about the bearing stud
C Compression spring axis
D Axis of the pin
E Axis of the eccentric lug

What is claimed is:

1. An interchangeable camera lens comprising:
a plurality of optical elements defining an optical axis (A);
a diaphragm defining a range of f-number values;
a main barrel configured to hold said optical elements and said diaphragm;
a diaphragm rotating ring configured to be rotatable about said optical axis (A) for setting said diaphragm to different ones of said f-number values via a rotational movement;
a click-stop device having an active work position and an inactive work position and being configured to interact with said diaphragm rotating ring such that:
i) said click-stop device is effective in said active work position and said diaphragm rotating ring is therefore rotatable in a stepped manner;
ii) said click-stop device is ineffective in said inactive work position and said diaphragm rotating ring is therefore continuously rotatable;
iii) wherein said click-stop device has a pressure element configured to apply pressure and a click-stop element disposed on said pressure element and said click-stop element being configured to be pressed into click-stop grooves via said pressure of said pressure element so as to enable rotation of said diaphragm rotating ring in a stepped manner in said active work position;

a selection device configured to selectively activate and deactivate said click-stop device;

said selection device having a movement element arranged between said pressure element and said click-stop element; and, a switch element associated with said movement element and configured to releasably fix said movement element so as to enable said click-stop element to be pressed into one of said click-stop grooves in said active work position and to prevent said click-stop element from being pressed into one of said click-stop grooves in said inactive work position.

2. The interchangeable camera lens of claim 1, wherein:
said main barrel has a radial bore formed therein;
said click-stop grooves are arranged on said diaphragm rotating ring; and,
said click-stop element of said click-stop device is disposed in said radial bore and is configured to be pressable into said click-stop grooves.

3. The interchangeable camera lens of claim 1, wherein:
said diaphragm rotating ring has a radial bore formed therein;
said click-stop grooves are arranged on said main barrel; and,
said click-stop element of said click-stop device is disposed in said radial bore and is configured to be pressable into said click-stop grooves.

4. The interchangeable camera lens of claim 1, wherein:
said main barrel has an axial bore formed therein;
said diaphragm rotating ring has an end face defining a planar surface facing said click-stop element;
said click-stop grooves are arranged on said planar surface of said end face of said diaphragm rotating ring; and,
said click-stop element of said click-stop device is disposed in said axial bore and is configured to be pressable into said click-stop grooves.

5. The interchangeable camera lens of claim 1, wherein:
said diaphragm rotating ring has an axial bore formed therein;
said main barrel has an end face defining a planar surface facing said click-stop element;
said click-stop grooves are arranged on said planar surface of said end face; and,
said click-stop element of said click-stop device is disposed in said axial bore and is configured to be pressable into said click-stop grooves.

6. The interchangeable camera lens of claim 1, wherein said click-stop element is configured as a sphere.

7. The interchangeable camera lens of claim 1, wherein said movement element is configured as a rocker or a wedge.

8. The interchangeable camera lens of claim 1 further comprising:
a bearing stud; and,
said movement element being configured as a rocker arranged pivotably about said bearing stud in said main barrel.

9. The interchangeable camera lens of claim 8, wherein the interchangeable camera lens defines a radial direction; and, said rocker is arranged pivotably in said radial direction about said bearing stud in said main barrel.

10. The interchangeable camera lens of claim 1, wherein said movement element is, in said active work position, released so as to cause said pressure element to press said click-stop element into one of said click-stop grooves via said movement element.

11. The interchangeable camera lens of claim 1, wherein said movement element, in said inactive work position, is fixed via said switch element in such a manner so as to prevent said pressure element from applying any pressure on said click-stop element.

12. The interchangeable camera lens of claim 1, wherein said switch element is configured to be settable to said inactive work position and said active work position from outside the interchangeable camera lens.

13. The interchangeable camera lens of claim 12, wherein:
the interchangeable camera lens has a bore provided therein; and,
said switch element is configured to be switched between said active work position and said inactive work position with an actuating element via said bore.

14. The interchangeable camera lens of claim 1 further comprising a switching spring configured to apply force to said switch element so as to cause said switch element to remain in the set one of said active work position and inactive work position until the work position is switched via an actuating element.

15. The interchangeable camera lens of claim 1, wherein said switch element is embodied as a pin.

16. The interchangeable camera lens of claim 15, wherein said pin has an eccentric element.

17. The interchangeable camera lens of claim 15, wherein said pin has an eccentric lug.

18. The interchangeable camera lens of claim 15, wherein said pin has an axial extension and a section along said axial extension having flattenings formed therein.

19. The interchangeable camera lens of claim 15, wherein said pin has an axial extension and a section along said axial extension having a first flattening and a second flattening formed therein; and, said first and said second flattening lie opposite each other.

20. The interchangeable camera lens of claim 19 further comprising:
a leaf spring configured to apply force to said switch element so as to cause said switch element to remain in the set one of said active work position and inactive work position until the work position is switched via an actuating element;
said main barrel having a recess formed therein;
said leaf spring being mounted in said recess and configured to press on said first flattening in said active work position and to press on said second flattening in said inactive work position; and,
said pin has an eccentric element configured to, in said active work position, fix said movement element and to, in said inactive work position, release said movement element.

21. The interchangeable camera lens of claim 1, wherein:
said diaphragm rotating ring has a plurality of f-values applied thereon; and,
said click-stop grooves are positioned so as to enable an exact setting, in said active work position, to individual ones of said f-values applied to said diaphragm rotating ring.

22. The interchangeable camera lens of claim 1, wherein said pressure element is embodied as a compression spring.

23. The interchangeable camera lens of claim 1 further comprising a lens mount configured to connect to a camera mount of a camera.

24. A method for activating and deactivating a click-stop device of a diaphragm of an interchangeable camera lens having a diaphragm rotating ring configured to be rotatable in a stepped manner in an active work position and to be continuously rotatable in an inactive work position, the interchangeable camera lens further having click-stop grooves, a movement element and a pressure element; the click-stop device having a click-stop element; the method comprising the steps of:

enabling a stepped rotation of the diaphragm rotating ring in the active work position in that the click-stop element is pressed into click-stop grooves via the pressure element; and, preventing a pressure transfer from the pressure element to the click-stop element in the inactive work position in that the movement element acts in an impeding manner between the pressure element and the click-stop element.

25. The method of claim 24, wherein the interchangeable camera lens further has:

a plurality of optical elements defining an optical axis; the diaphragm defining a range of f-number values; a main barrel configured to hold the optical elements and the diaphragm; the diaphragm rotating ring being configured to be rotatable for setting the diaphragm to different ones of the f-number values via a rotational movement; the click-stop device defining the active work position and the inactive work position and being configured to interact with the diaphragm rotating ring such that:

i) the click-stop device is effective in the active work position and the diaphragm rotating ring is therefore rotatable in a stepped manner;

ii) the click-stop device is ineffective in the inactive work position and the diaphragm ring is therefore continuously rotatable;

iii) the click-stop device having a pressure element configured to apply pressure and the click-stop element being disposed on said pressure element and configured to be pressed into click-stop grooves via the pressure on the pressure element so as to enable rotation of the diaphragm rotating ring in a stepped manner in the active work position;

means for selectively activating and deactivating the click-stop device;

the means for selectively activating and deactivating the click-stop device having a movement element arranged between the pressure element and the click-stop element; and, a switch element associated with the movement element and configured to releasably fix the movement element so as to enable said click-stop element to be pressed into the click-stop grooves in the active work position and to prevent the click-stop element from being pressed into the click-stop grooves in the inactive work position.

* * * * *